US008583583B1

(12) United States Patent
Stachnick et al.

(10) Patent No.: US 8,583,583 B1
(45) Date of Patent: Nov. 12, 2013

(54) CYBER AUTO TACTICS TECHNIQUES AND PROCEDURES MULTIPLE HYPOTHESIS ENGINE

(75) Inventors: Gregory L. Stachnick, Cupertino, CA (US); Thomas C. Fall, Los Gatos, CA (US); David A. Cameron, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 448 days.

(21) Appl. No.: 12/807,901

(22) Filed: Sep. 16, 2010

(51) Int. Cl.
*G06N 7/02* (2006.01)
(52) U.S. Cl.
USPC .......................................................... 706/52
(58) Field of Classification Search
None
See application file for complete search history.

(56) References Cited

U.S. PATENT DOCUMENTS

| 7,930,256 B2 * | 4/2011 | Gonsalves et al. ............. 706/11 |
| 2007/0143850 A1 * | 6/2007 | Kraemer et al. ................ 726/25 |

OTHER PUBLICATIONS

Neil, Fenton, Marquez, "Using Bayesian Networks and Simulation for Data Fusion and Risk Analysis" in NATO Science for Peace and Security Series: Information and Communications Security, IOS Press, Nieuwe Hemweg 6B, 1013 BG Amsterdam, The Netherlands, vol. 13, 2007, pp. 1-13.*

Bulashevska, "Model-based Classification for Subcellular Localization Prediction of Proteins", phD thesis, Karlsruhe Institute of Technology 2005, pp. 1-98.*
Neil, Fenton, Marquez, "Using Bayesian Networks and Simulationfor Data Fusion and Risk Analysis" in NATO Science for Peace and Security Series: Information and Communications Security, IOS Press, Nieuwe Hemweg 6B, 1013 BG Amsterdam, The Netherlands, vol. 13, 2007, pp. 1-13.*
Valdes, Skinner, "Adaptive, Model-based Monitoring for Cyber Attack Detection", Proceeding RAID '00 Proceedings of the Third International Workshop on Recent Advances in Intrusion Detection, 2000, pp. 80-92.*

* cited by examiner

*Primary Examiner* — Kakali Chakl
*Assistant Examiner* — Walter Hanchak
(74) *Attorney, Agent, or Firm* — Oblon, Spivak, McClelland, Maier & Neustadt, L.L.P.

(57) ABSTRACT

Disclosed is an exemplary multiple hypothesis engine that provides situation assessment capabilities regarding cyber auto tactics techniques and procedures. Dynamic cyber adversarial operations are evaluated via a combination of techniques using a Bayesian multiple hypothesis tree, or graph, as a framework. A top-down probability propagation mechanism solves different aspects of the problem in a round-robin fashion. The top-down probability propagation mechanism comprises the Hypothesis Refinement Engine. A model-based abductive reasoner comprising The Hypothesis Validator is used to confirm or refute the refined hypothesis. A model-based learning engine comprising Behavior Model Trainer is used to incrementally augment the knowledge base of behavior models as new adversarial TTPs are discovered. These three techniques behave in a cooperative manner by operating upon the Bayesian multiple hypothesis tree framework.

3 Claims, 9 Drawing Sheets

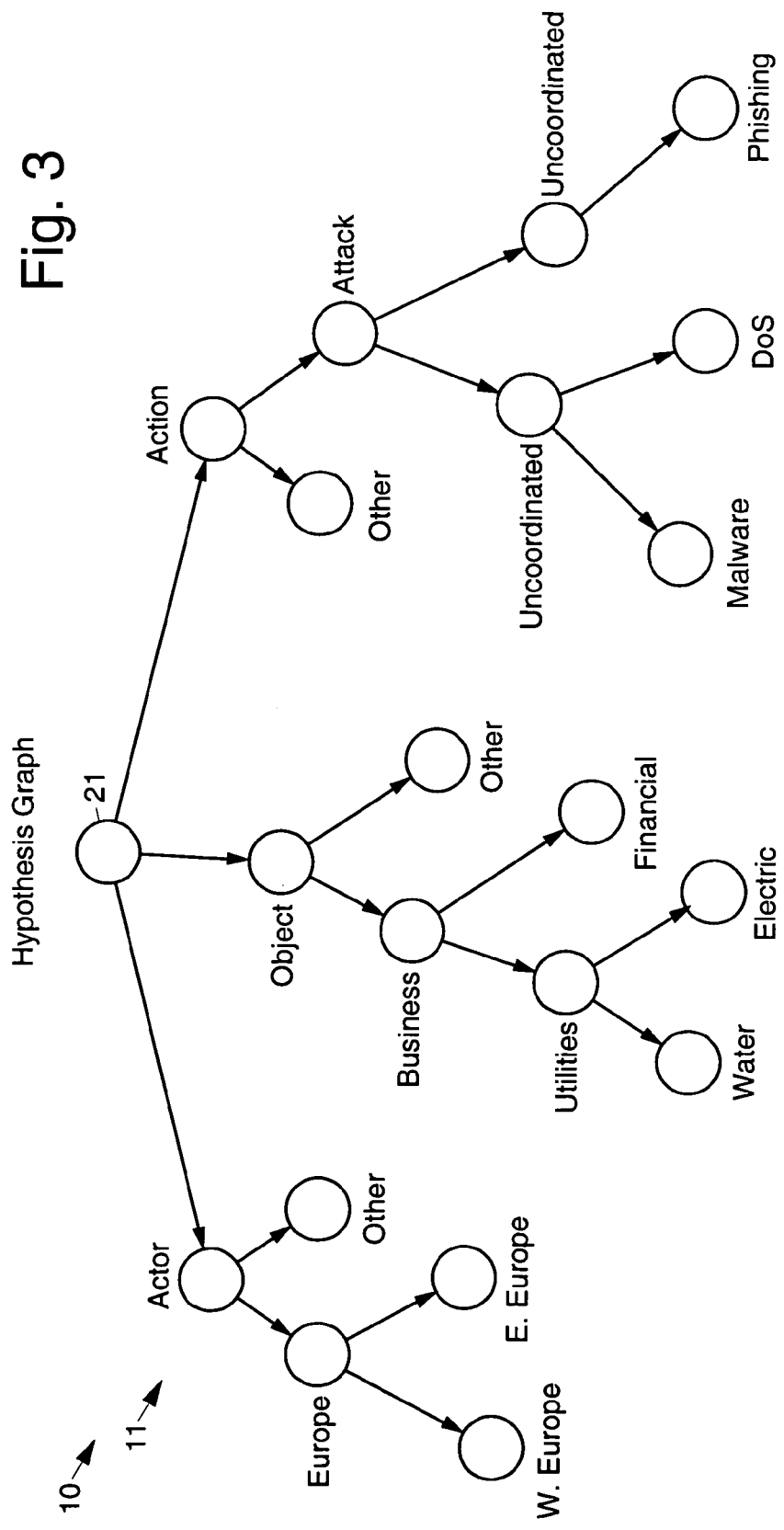

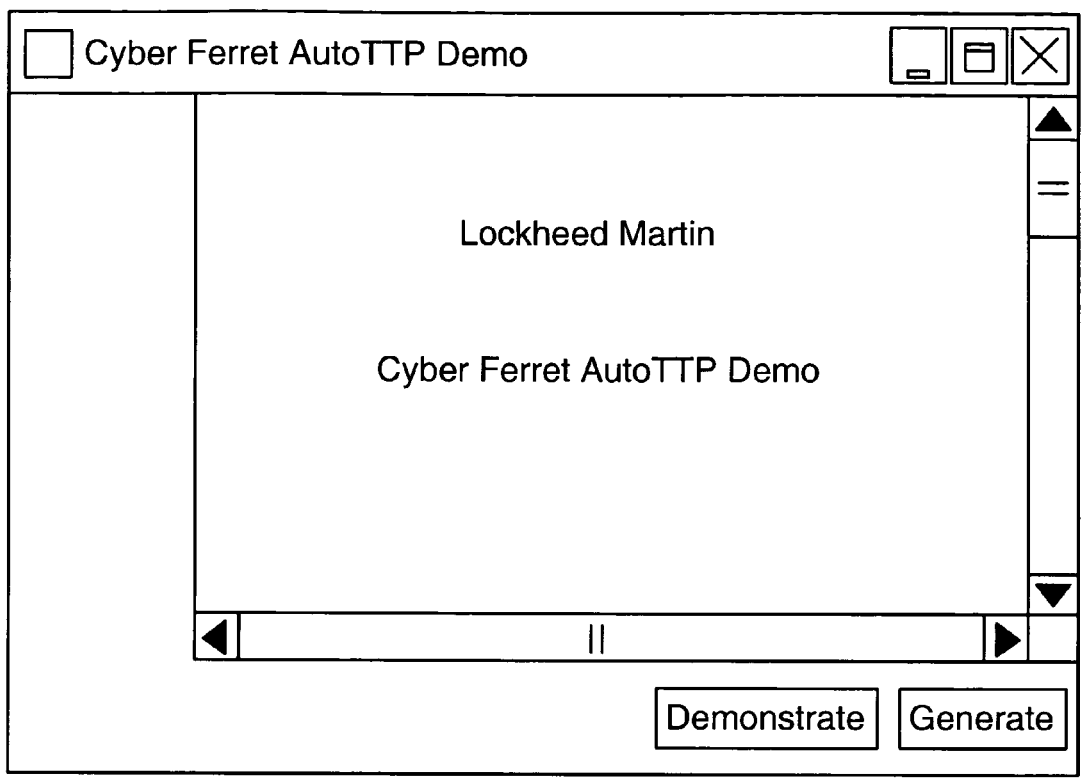
Fig. 6
Fig. 7
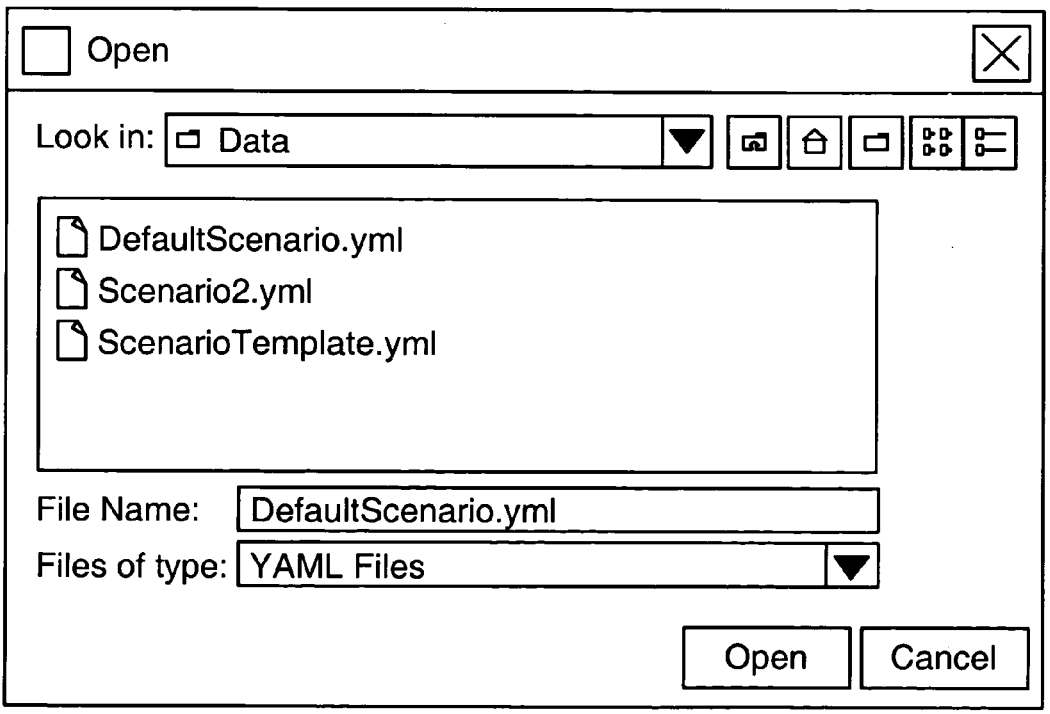

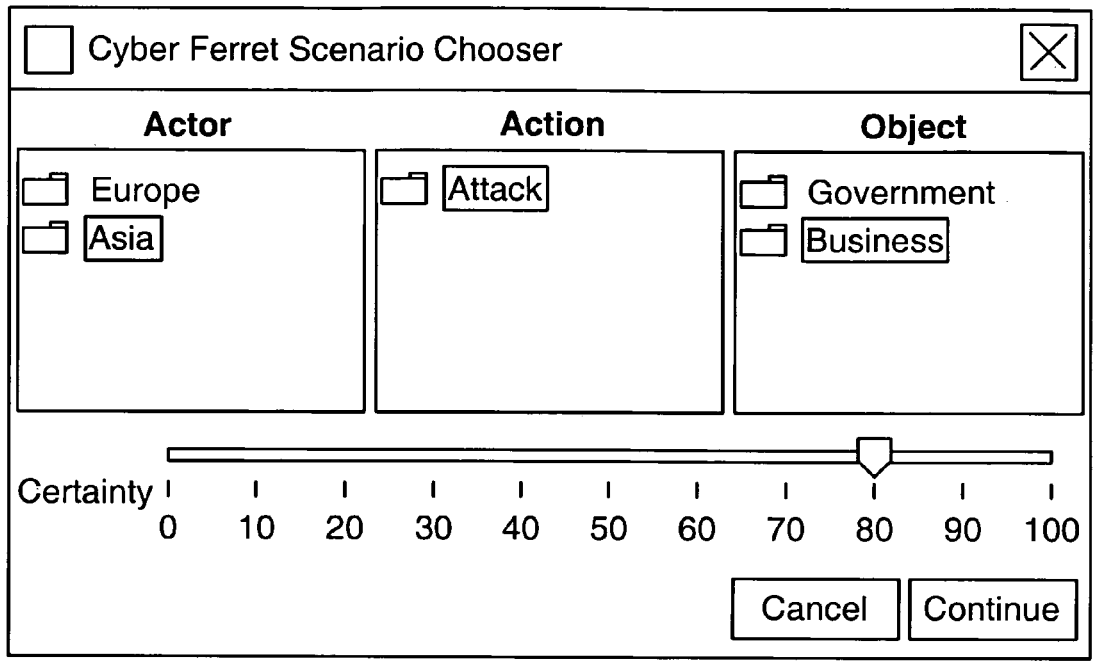
Fig. 8
Fig. 9
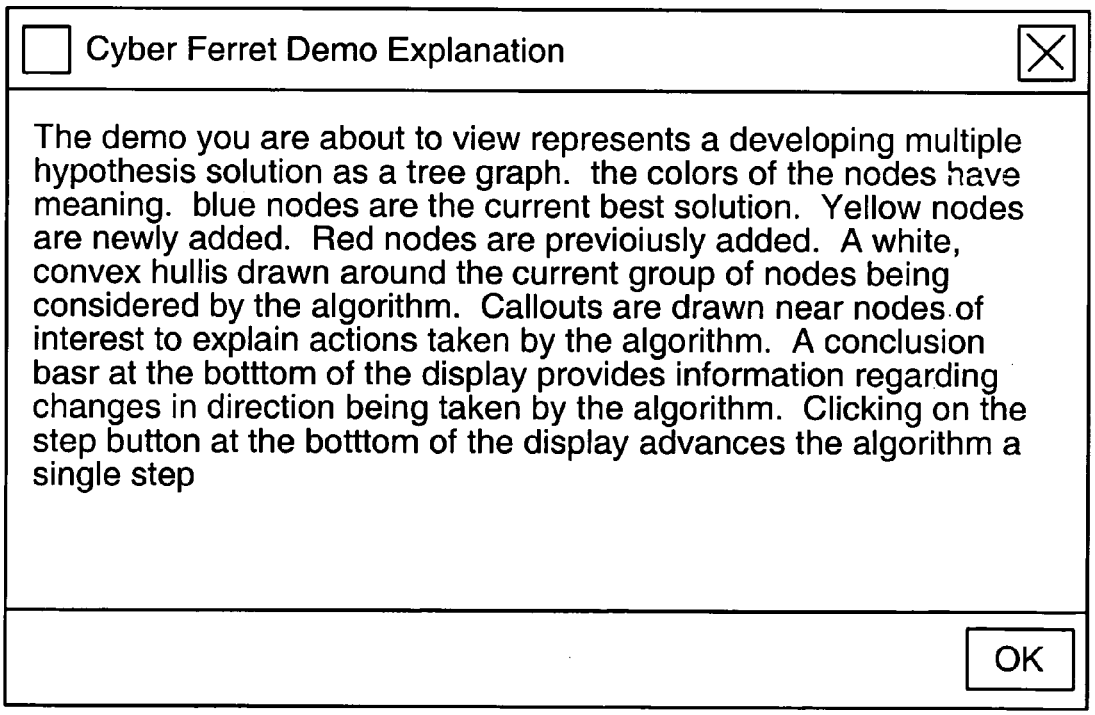

CYBER AUTO TACTICS TECHNIQUES AND PROCEDURES MULTIPLE HYPOTHESIS ENGINE

BACKGROUND

The present invention relates generally to multiple hypothesis engines, and more particularly to multiple hypothesis engines that provide situation assessment relating to cyber auto tactics techniques and procedures.

Rapidly changing dynamic cyber adversarial operations require situation assessment capabilities beyond conventional signature-based methods that can instantaneously provide evaluations of current conditions within the context of on-going operational missions.

It would be desirable to have a multiple hypothesis engine that provides improved situation assessment relating to cyber auto tactics techniques and procedures.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 3 illustrates ambiguity resolution and lines of reasoning employed in the processing algorithm embodied in the exemplary multiple hypothesis engine;

FIG. 6 illustrates an exemplary main screen of an exemplary demonstration multiple hypothesis engine;

FIG. 7 illustrates an exemplary file open demonstration screen of the exemplary demonstration multiple hypothesis engine;

FIG. 8 illustrates an exemplary scenario chooser screen of the exemplary demonstration multiple hypothesis engine;

FIG. 9 illustrates an exemplary explanation screen of the exemplary demonstration multiple hypothesis engine;

DETAILED DESCRIPTION

Disclosed is an exemplary multiple hypothesis engine that provides situation assessment capabilities regarding cyber auto tactics techniques and procedures. The problem of evaluating dynamic cyber adversarial operations is solved via a combination of techniques using a Bayesian multiple hypothesis tree, or tree graph, as a framework. The first technique is a top-down probability propagation mechanism which solves different aspects of the problem in a round-robin fashion. The top-down probability propagation mechanism comprises a Hypothesis Refinement Engine. The second technique is a model-based abductive reasoner. The model-based abductive reasoner comprises a Hypothesis Validator. The model-based abductive reasoner is used to collect additional evidence to confirm or refute the hypothesis currently being evaluated. The final technique is a model-based learning engine. The model-based learning engine comprises a Behavior Model Trainer. The model-based learning engine is used to augment the behavior model knowledge base of adversarial Tactics, Techniques, and Procedures (TTPs). These three techniques behave in a cooperative manner by operating upon the Bayesian multiple hypothesis tree framework.

The multiple hypothesis engine employs an algorithm that models the reasoning process that intelligence analysts use when analyzing activities of an adversary. The algorithm embodies a process by which a suspicion is expanded upon based on experience. Once the suspicion has been expanded, it is determined what should be measured to verify or refute that suspicion. The multiple hypothesis engine implements an algorithm that provides for an expansion and refinement of a suspicion based on historical behavior. Implementation of the algorithm provides a generic framework for constructing hypothesis graphs and executing algorithms over them. A demonstration has been implemented in Java that illustrates this capability.

Explanation of the algorithm employed in the multiple hypothesis engine is broken up into multiple passes to minimize confusion. The first pass described how probability is propagated through a hypothesis graph. The second pass explains how inputs to the probabilities are derived. The third pass explains how the algorithm resolves ambiguous results.

An entity known as a contextual hierarchical knowledge (CHK) store (library or database) is referenced throughout. This is a store of real world data organized hierarchically. It is this knowledge store that provides the experience and drives hypothesis expansion. Values such as Ratio, and Danger are derived from the historical data stored in the contextual hierarchical knowledge store. The second part of the explanation will describe exactly how these values are derived.

Figure 1:
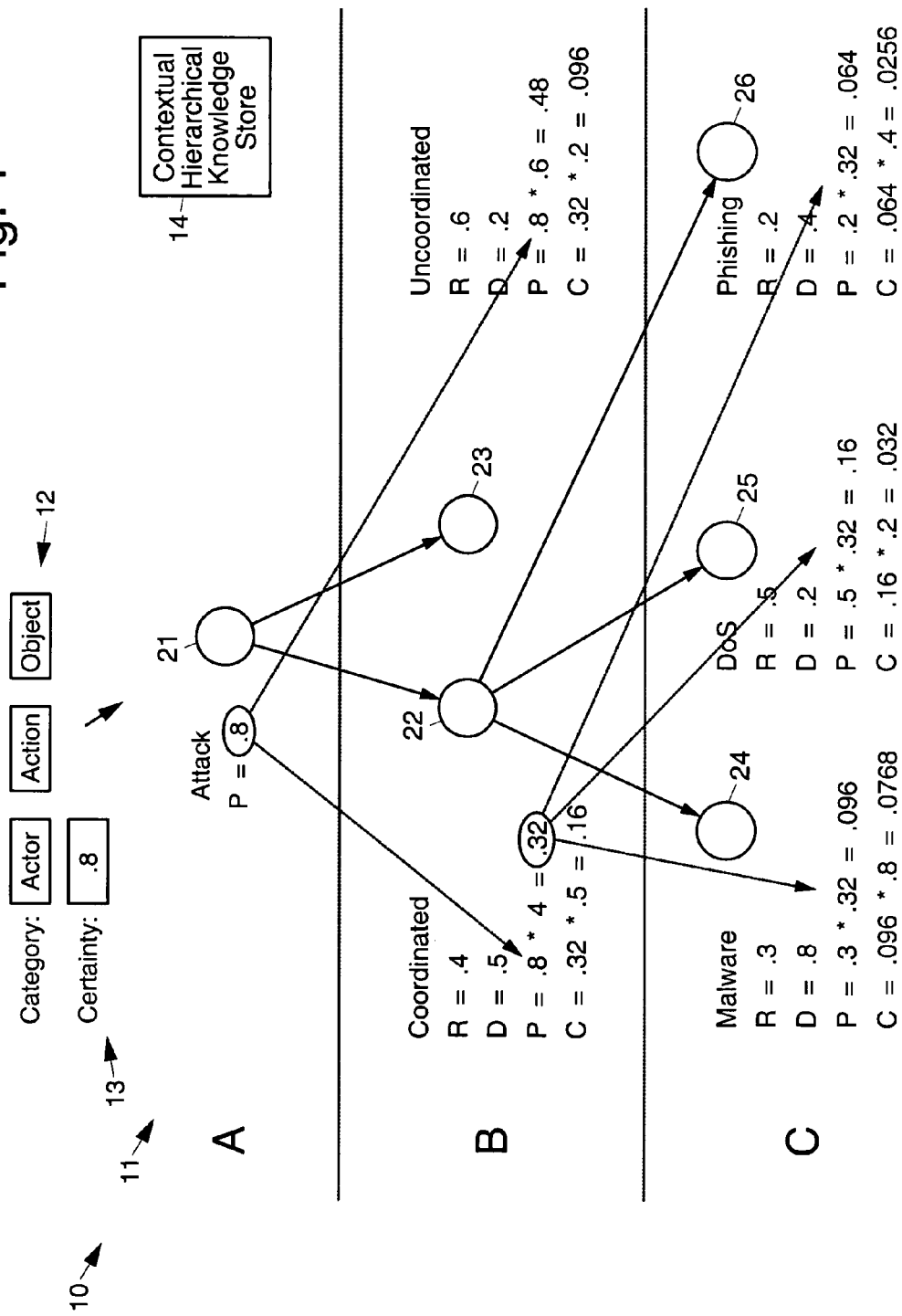
FIG. 1 illustrates hypothesis expansion and probability propagation used in a processing algorithm embodied in an exemplary multiple hypothesis engine.

Referring to the drawing figures, FIG. 1 illustrates hypothesis expansion and probability propagation used in a processing algorithm 11 embodied in an exemplary multiple hypothesis engine 10. FIG. 1 shows an example of calculations involve in developing a hypothesis. The example in FIG. 1 shows selected steps of the algorithm 11: A, B and C. P stands for Weighted Probability, R stands for Ratio, D stands for Danger, and C stands for Certainty.

A user selects one element from each of Actor, Action and Object categories 12. An "Attack" Action is selected by the user. The user also selects or indicates a Certainty value 13 (i.e., 0.8) that the Attack Action will occur.

In step A, a user has specified a 0.8 certainty (C) that an Attack is underway FIG. 1 shows the initial probability specified as P=0.8. The algorithm 11 locates Attack in a contextual hierarchical knowledge store 14 and expands an Attack node 21 so that it has Coordinated and Uncoordinated child nodes 22, 23. The algorithm 11 then calculates a weighted probability (P) for the Coordinated and Uncoordinated child nodes 22, 23, which are 0.32 and 0.48 respectively. The weighted probability (P) of a child node 22, 23 is the weighted probability of the parent node (i.e., Attack node 21) multiplied by the ratio (R) of the child node 22, 23 (ratio of the what to what?). The certainty (C) of a child node 22, 23 is the weighted probability (P) multiplied by the Danger (D). Then the algorithm 11 evaluates the Certainty (C) of the Coordinated and Uncoordinated child nodes 22, 23. Because the Coordinated child node 22 has a higher certainty (C) than the Uncoordinated child node 23, it chooses the Coordinated child node 22 to be the new current node.

In step B, the algorithm 11 inspects the current node to discover that the Coordinated child node 22 is the current node. The algorithm 11 then locates the Coordinated node in the contextual hierarchical knowledge store 14 and expands the Coordinated child node 222 with Malware, DoS and Phishing child nodes 24, 25, 26. The algorithm 11 performs the same calculations as in Step A to determine that the Malware, DoS and Phishing child nodes 24, 25, 26 have Weighted Probabilities (P) of 0.096, 0.16 and 0.064 respectively. The algorithm 11 then calculates certainty (C) for each of these nodes 24, 25, 26 to determine that the Malware child node 24 is the new current node.

In step C, the algorithm 11 inspects the nodes to discover that the Malware node 24 is the current node. The algorithm 11 then locates the Malware node in the contextual hierarchical knowledge store 14 and finds no children to expand. At this point the algorithm 11 cannot expand the hypothesis any further and stops.

Figure 2:
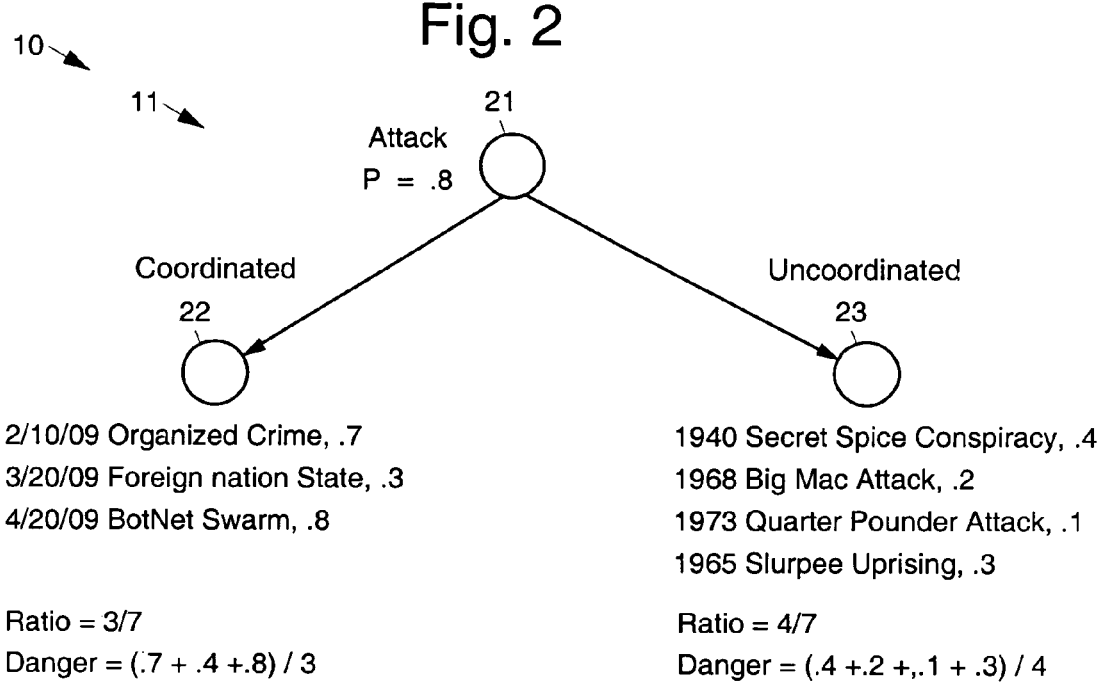
FIG. 2 illustrates inputs and evidence rollups associated with the processing algorithm embodied in the exemplary multiple hypothesis engine.

FIG. 2 illustrates inputs and evidence rollups associated with the processing algorithm 11 embodied in the exemplary multiple hypothesis engine 10. What is meant by evidence rollup is a re-calculation of the weighted historical probabilities based on the value of the current node. The following, in conjunction with FIG. 2, explains how the values of Ratio (R) and Danger (D) are derived.

The inputs for the algorithm 11 come from the contextual hierarchical knowledge store 14. Two values are determined for each child node (i.e., Coordinated and Uncoordinated child nodes 22, 23) of the node (i.e., Attack node 21) that is expanded upon. These values are Ratio (R) and Danger (D). Ratio (R) is the ratio of historic incidents that have been recorded for that node in relation to the others. Danger (R) is the average of the danger values for the historic incidents on that node.

There is one further complication that requires explaining. The raw set of historic evidence from that node in the contextual hierarchical knowledge store 14 is not used. What happens is that the algorithm 11 performs a rollup of the historical evidence for the other lines of reasoning being calculated in parallel. So while this example focuses on Action, there are also Object and Actor lines of reasoning being expanded. The algorithm 11 locates the current node for Actor and performs a rollup of the historic evidence for the current Actor and its descendants. It then takes a rollup of the evidences from the current Object and its descendants. Finally the algorithm 11 locates all evidence for the current Actor node under consideration and its descendants. The evidence considered for each node being expanded is the intersection of its rollup and that of the current Actor and Object nodes. This has implications that will be explained later.

FIG. 3 illustrates ambiguity resolution and lines of reasoning employed in processing algorithm 11 embodied in the exemplary multiple hypothesis engine 10. What will now be discussed is how the algorithm 11 works on multiple lines of reasoning at any given time. FIG. 3 shows a simple hypothesis graph with a few nodes expanded.

The algorithm 11 arbitrarily chooses one line of reasoning to start with. Following each expansion of a node the algorithm 11 considers the certainty of each new node. If there is not enough different between the certainty values for the potential new current nodes, it changes to a different line of reasoning. So it may start expanding Action and determine at the Uncoordinated node that the certainty values for Malware, DoS and Phishing are too close to call.

When the algorithm 11 decides that the certainties are too close to call, it chooses a new line of reasoning to expand. It will continue to work on each line of reasoning round-robin until it ceases to choose new current nodes for any of the lines of reasoning. The algorithm 11 could give up on a line of reasoning for one of two reasons. The first is it runs out of history to use to expand the current node. The other reason to move on is due to ambiguity.

What happens is, if the algorithm 11 can successfully expand nodes and choose new current nodes for other lines of reasoning, the evidence for a line of reasoning which was previously considered ambiguous will change. The evidence changes because it uses the rollup of evidence from other lines of reasoning when any node expansion takes place. Thus, the algorithm 11 eventually comes back to consider the Uncoordinated node 23.

When the algorithm 11 eventually works its way around to the Uncoordinated node 23, it recalculates the ratio (R) and danger (D) values and then determines if the certainty for the Malware, DoS and Phishing nodes 24, 25, 26 are still ambiguous.

Figure 4:
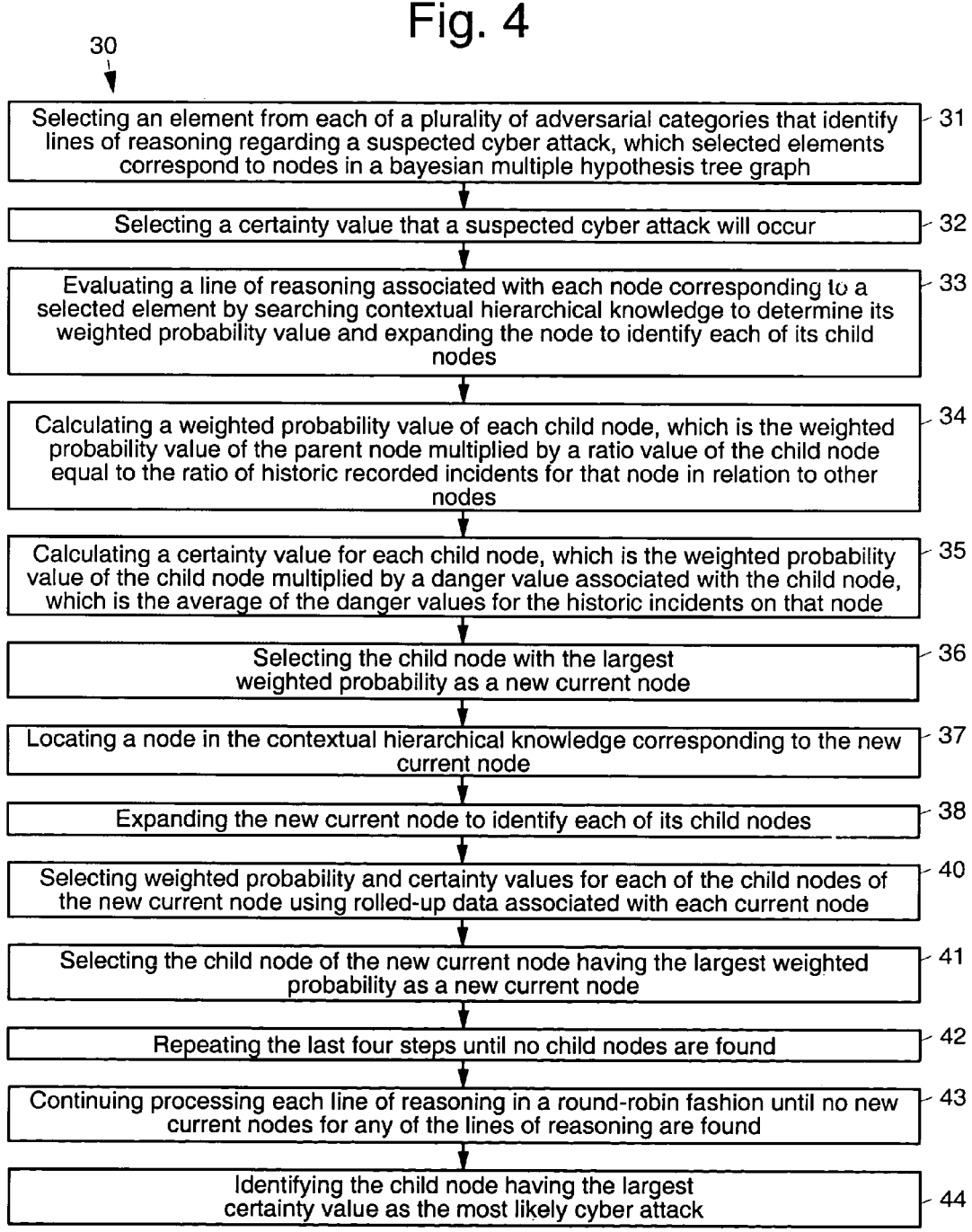
FIG. 4 is a flow diagram that illustrates one method for implementing the exemplary multiple hypothesis engine.

FIG. 4 is a flow diagram that illustrates an exemplary method 30 for implementing an exemplary multiple hypothesis engine 10.

In implementing the algorithm 11 an element is selected 31 from each of a plurality of predetermined adversarial categories that identify lines of reasoning regarding a suspected cyber attack, which selected elements correspond to nodes in a Bayesian multiple hypothesis tree graph. A certainty value that the suspected cyber attack will occur is selected 32.

For each node corresponding to a selected element, a line of reasoning associated therewith is evaluated 33 by searching a contextual hierarchical knowledge store to determine its weighted probability value and expanding the node to identify each of its child nodes. A weighted probability value of each of the child nodes is calculated 34, which is the weighted probability value of the parent node multiplied by a ratio value of the child node, which is the ratio of historic recorded incidents for that node in relation to other nodes. A certainty value for each child node is calculated 35, which is the weighted probability value of the respective child node multiplied by a danger value associated with the respective child node, which is the average of the danger values for the historic incidents on that node.

The child node having the largest weighted probability is selected 36 as a new current node. A node in the contextual hierarchical knowledge store corresponding to the new current node is located 37. The new current node is expanded 38 to identify each of its child nodes. Weighted probability and certainty values are calculated 39 for each of the child nodes of the new current node using rolled-up data associated with each current node. The child node of the new current node having the largest weighted probability is selected 41 as a new current node;

The last four steps are repeated 42 until no child nodes are found. The algorithm 11 continues processing 43 each line of reasoning in a round-robin fashion until no new current nodes for any of the lines of reasoning are found. The child node having the largest certainty value is identified 43 as the most likely cyber attack.

Figure 5:
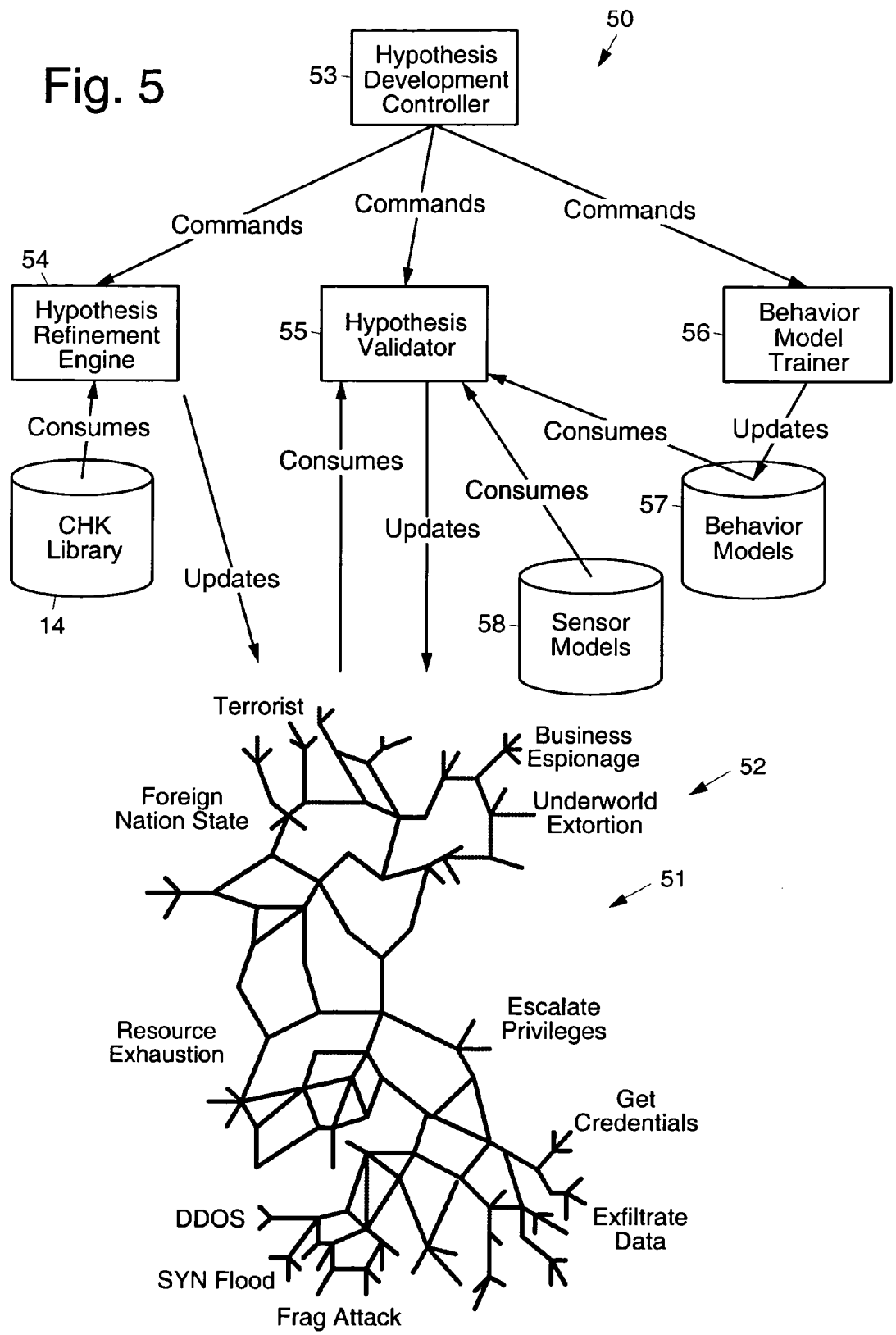
FIG. 5 illustrates an exemplary Auto TTP generator used in implementing the exemplary multiple hypothesis engine.

Situation assessment involves the process of developing tactics, techniques, and procedures (TTPs). The component addressing this is referred to as an Auto TTP generator 50. FIG. 5 illustrates an exemplary Auto TTP generator 50 used in implementing the exemplary multiple hypothesis engine 10. The generator develops multiple hypotheses describing the adversarial tactics, techniques, and procedures. The hypotheses are accessed through a multiple hypothesis framework 51 and encoded in a complex hierarchical graph structure 52 (i.e., a Bayesian multiple hypothesis tree 52, or tree graph 52). The Auto TTP generator 50 processes information derived from the multiple hypothesis framework 51 and generates attack patterns, threat models and threat behavior patterns, for example, and updates the multiple hypothesis framework.

The Auto TTP generator comprises a controller 53 and three reasoning engines including a hypothesis refinement engine (HRE) 54, a hypothesis validator 55, and a behavior model trainer 56. A hypothesis contains information about actors, actions, and objects. The hypothesis refinement engine (HRE) 54 receives data from the Contextual Hierarchical Knowledge Library 14. The behavior model trainer 56 receives commends from the controller 53 and updates behavior models 57 that are used by the hypothesis validator 55. The hypothesis validator 55 receives commends from the controller 53, updated behavior models 57, sensor models 58, and hypotheses derived from the complex hierarchical graph structure 52.

By way of example, an actor performs an action on an object. Then, a user may start the hypothesis refinement engine 54 by entering a high level hypothesis such as: agents in Easter Europe are attacking US Public Utilities.

The Contextual Hierarchical Knowledge Library 14 contains historical information about these classes of entities. This knowledge is used to develop hypotheses by incrementally refining along the actor, action, and object dimensions.

The Auto TTP generator 50 employs a new type of multiple hypothesis reasoning engine. 54 All hypotheses are represented in a single graph 52. The graph 52 is dynamically constructed, and is not predefined. Hypotheses are expanded only when sufficient probability warrants doing so, not just because it is convenient, or easy. Common elements of separate hypotheses are represented in a single subgraph. The process begins with the user entering a high level notion or hunch of what he believes is going on in terms of actor, action and object or target. These characteristics control combinatorial explosions, manage computational tractability. They also eliminate the need for complex graph comparison algorithms and complicated pruning algorithms required by other approaches.

Reduction to Practice

The multiple hypothesis engine 10 may be implemented in the form as an executable Java™ archive (JAR) file. The executable JAR file launches an installer that asks a user a minimum number of questions required to install the file. The installer implemented in a reduced-to-practice embodiment of the multiple hypothesis engine 10 is targeted for a Windows® XP operating system, although the software it installs is platform-independent Java. A reduced-to-practice embodiment of the installer can run on any Java Runtime Environment (JRE) from 1.4.2 forward while the software itself requires JRE 6.

Once installed, the software may be launched using a program group in the Windows Start menu. In the reduced-to-practice embodiment, the program group is labeled "Lockheed Martin IS&GATO". There is a subgroup called "Cyber Ferret AutoTTP." Under the "Cyber Ferret AutoTTP" group are two menu options. The menu option called "AutoTTP Demonstration" launches the demonstration. Launching the demonstration uses a simple Batch script that locates the path to JRE 1.6, configures the Classpath, and then launches the demonstration. A menu option called "Uninstall AutoTTP" removes the software from the machine.

Main Screen

Once the demonstration launches, a main screen is displayed. FIG. 6 illustrates an exemplary main screen of the Cyber Ferret AutoTTP Demonstration. A user interface was designed to resemble a software utility. It displays a simple splash screen to let the user know it is launching. Once launched, the user is presented with a simple main screen with an explanation of how to use the software and two buttons for each of the only two features. The two features are Demonstrate and Generate accessed using selectable Demonstrate and Generate selection buttons.

Demonstration

Referring to FIG. 7, clicking on the Demonstrate button allows the user to choose a scenario file which is subsequently loaded by an implementation of the algorithm coupled with a visualization tool. A default scenario is supplied with the demo called DegaultScenario.yml. Once the scenario is loaded, the user is presented with a configuration screen, such as is shown in FIG. 8, which collects a starting suspicion for the multiple hypothesis algorithm 11 to expand. The user chooses one element from each of the Actor, Action and Object categories. The user then chooses a Certainty value and click son Continue.

The user is then presented with a short explanation of the notations used in the demo as is illustrated in FIG. 9. What happens in the demo can be confusing without this explanation. The explanation is as follows.

"The demo you are about to view represents a developing multiple hypothesis solution as a tree graph. The colors of the nodes have meaning. Blue nodes are the current best solution. Yellow nodes are newly added. Red nodes are previously added. A white, convex hull is drawn around the current group of nodes being considered by the algorithm. Callouts are drawn near nodes of interest to explain actions taken by the algorithm. A conclusion bar at the bottom of the display provides information regarding changes in direction being taken by the algorithm. Clicking on the step button at the bottom of the display advances the algorithm a single step."

Figure 10:
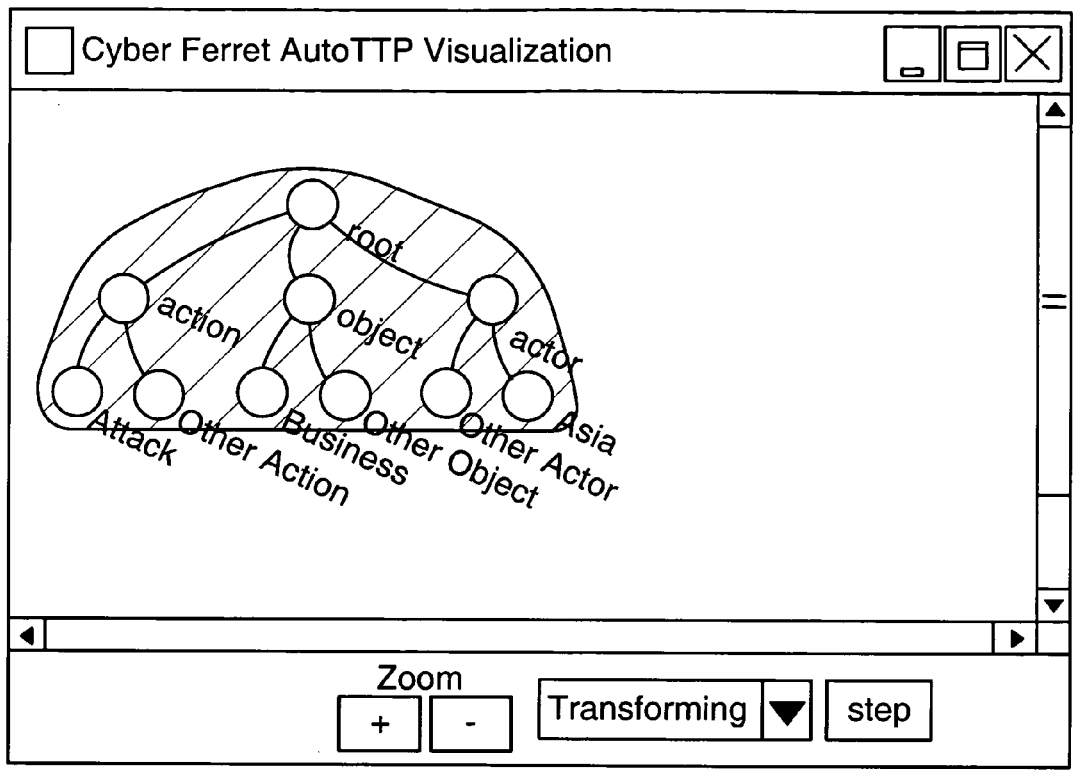
FIG. 10 illustrates an exemplary visualization screen of the exemplary demonstration multiple hypothesis engine showing an exemplary hypothesis graph.

For the purposes of this description, Blue nodes are identified in FIGS. 8-10 with a "B," Yellow nodes are identified with a "Y," and Red nodes are identified with an "R."

After clicking okay (OK) on this the user is shown an unobscured multiple hypothesis visualization.

Referring to FIG. 10, the hypothesis graph features minimal controls. There are zoom buttons for increasing and decreasing the size of the hypothesis graph in the display. There is a toggle that switches mouse behavior between Transforming and Picking. Each press of the step button causes the AutoTTP multiple hypothesis engine 10 to iterate once. The set of nodes shown in FIG. 9 is highlighted using cross-hatching as an area of focus.

Figure 11:
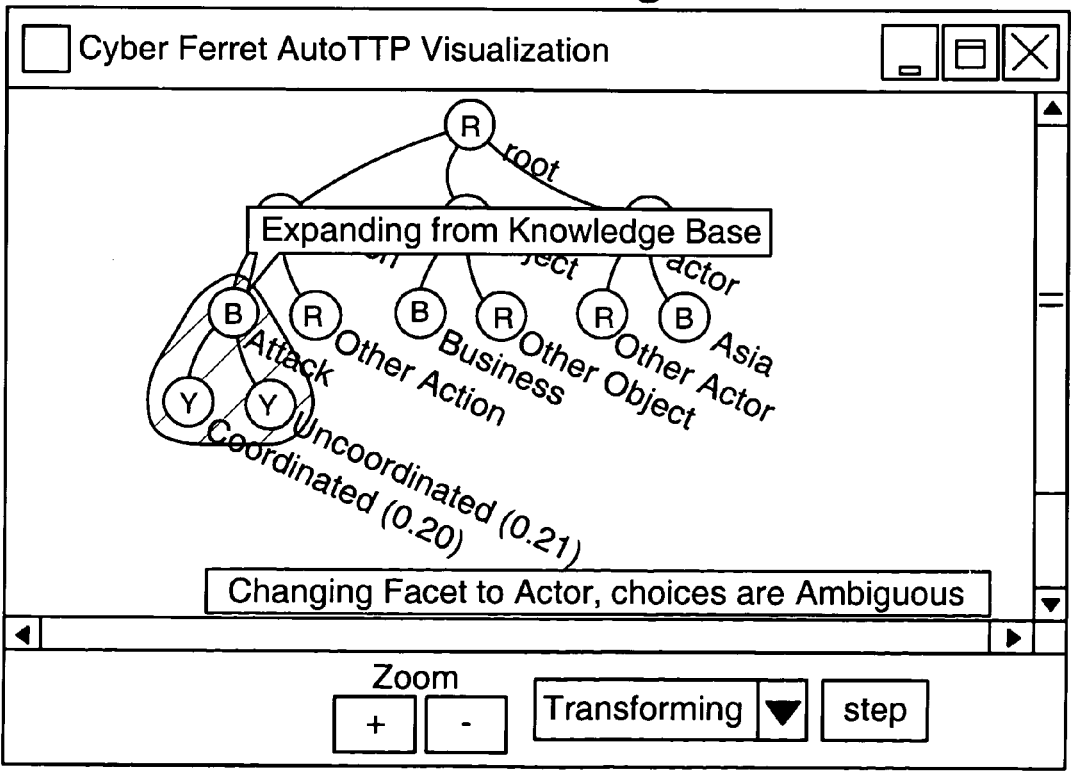
FIG. 11 illustrates another exemplary visualization screen of the exemplary demonstration multiple hypothesis engine showing an iterated hypothesis graph.

Each iteration of the algorithm 11 results in one or more changes to the display. Referring to FIG. 11, if the algorithm expands a node in the hypothesis tree the new nodes appear on the display in yellow (Y). A white convex hull is drawn around the subset of nodes which were reasoned over during that last iteration of the algorithm. In FIG. 11 the lower left set of three nodes is highlighted using cross-hatching as an area of focus. In FIG. 11, a conclusion bar explains that the choices for a new node were ambiguous and it is changing facets as a result. The new nodes smoothly fly into the display with their callouts.

Figure 12:
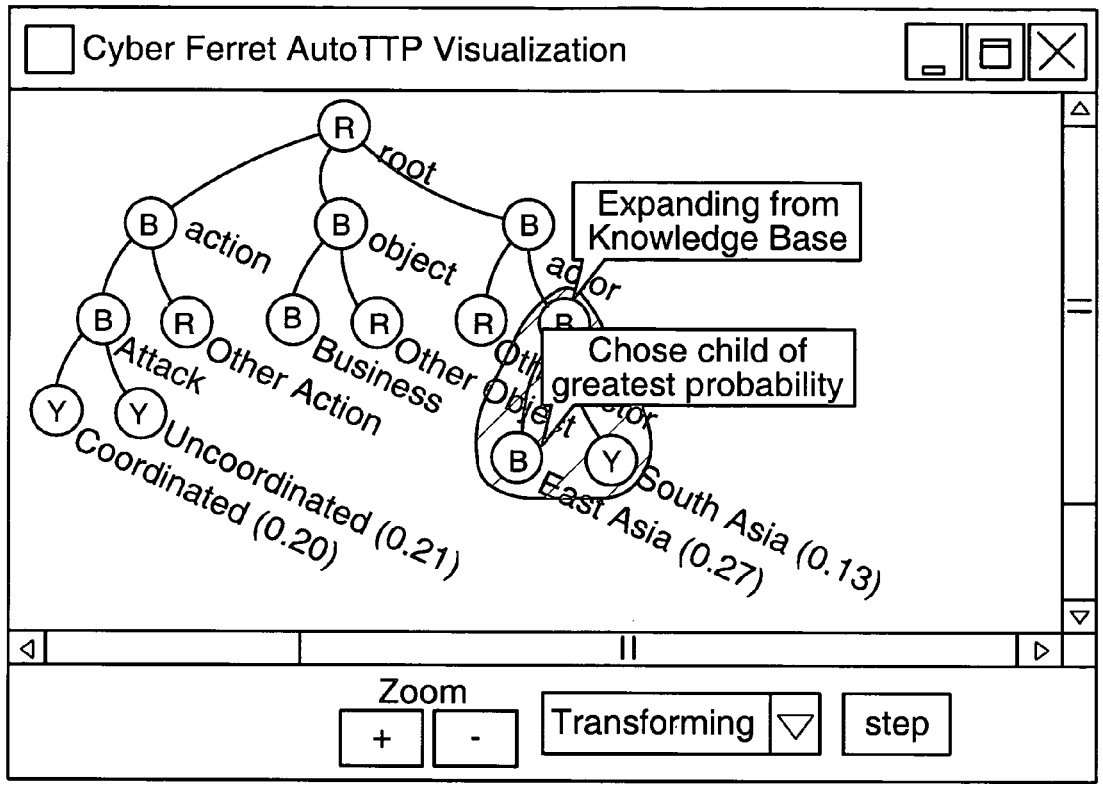
FIG. 12 illustrates another exemplary visualization screen of the exemplary demonstration multiple hypothesis engine showing a further iterated hypothesis graph show a change in the line of reasoning from action to actor.

Referring to FIG. 12, in this iteration the algorithm 11 expanded a node based on the Knowledge Base and choose a new child of greatest probability. In FIG. 12 the lower right set of three nodes is highlighted using cross-hatching as an area of focus.

Contextual Hierarchical Knowledge (CHK) Browser

Figure 13:
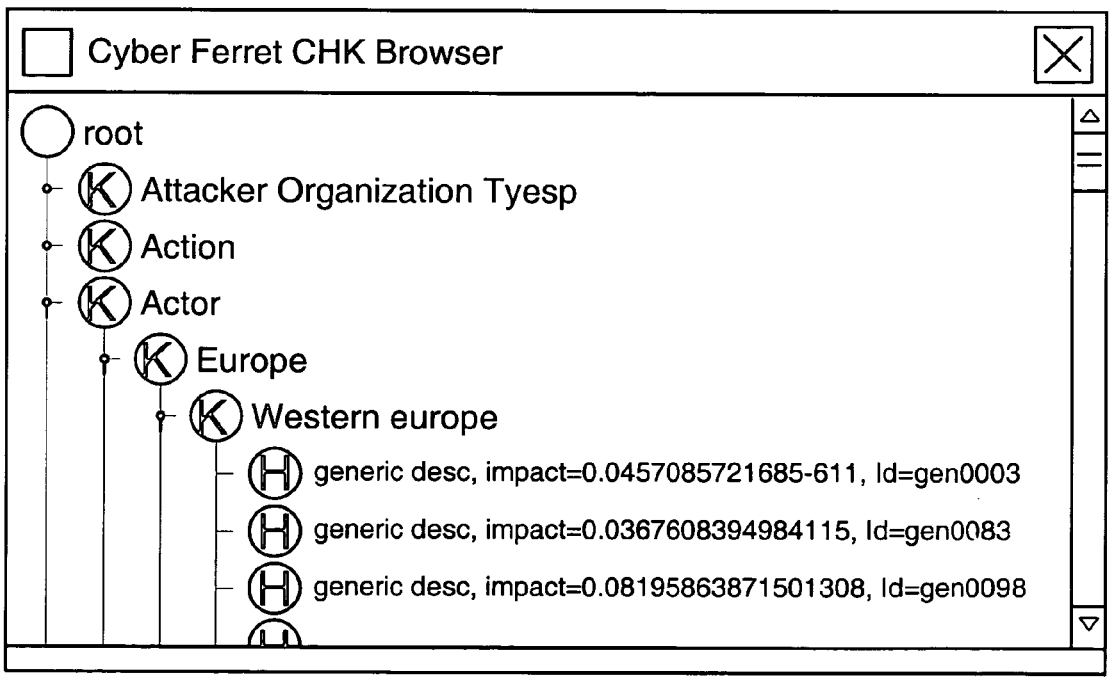
FIG. 13 illustrates an exemplary contextual hierarchical knowledge browser screen of the exemplary demonstration multiple hypothesis engine.

Referring to FIG. 13, the visualization features a button bar with a single button for bringing up the contextual hierarchical knowledge browser. The contextual hierarchical knowledge (CHK) store is also referred to as a Knowledge Base. The browser features Knowledge and the historical data associated with that knowledge. The knowledge nodes are what the algorithm 11 uses to expand a node in the hypothesis graph. The lower three O-indicators in the original figure are pointing down to indicate those nodes have already been expanded The history is used by the algorithm 11 to calculate probabilities and ratios. None of this data is hard coded and is read from the file chosen by the user. This file follows the data format outlined by YAML. Information regarding YAML is available at http://yaml.org.

Generation

Figure 14:
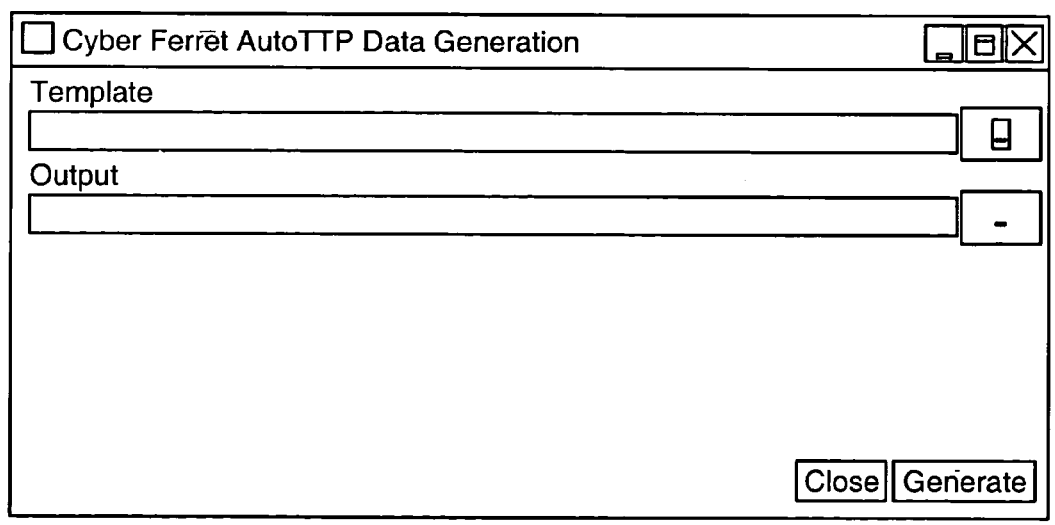
FIG. 14 illustrates an exemplary data generation screen of the exemplary demonstration multiple hypothesis engine.

It became apparent during construction of the demonstration that entering enough data into the knowledge base and then tweaking it to make the demonstration interesting was going to be a challenge. Consequently, a random scenario generation tool was constructed. Referring to FIG. 14, the random scenario generation tool takes a template as an input which outlines the knowledge part of the hypothesis graph. A template is provided to start called ScenarioTemplate.yml. This template was used to generate the DefaultTemplate.yml file.

As is shown in FIG. 13, to generate new random data, the Generate button is clicked on in the main screen and a dialog is displayed that takes an input and output. The template is a file structured like DefaultTemplate.yaml. The output is a file which is created or overwritten that resembles the input template only with random historic data generated for it.

Thus, a fast, a multiple hypothesis engine that provides situation assessment relating to cyber auto tactics techniques and procedures has been disclosed. It is to be understood that the above-described embodiment is merely illustrative of some of the many specific embodiments that represent applications of the principles discussed above. Clearly, numerous and other arrangements can be readily devised by those skilled in the art without departing from the scope of the invention.

What is claimed is:

1. A multiple hypothesis engine for evaluating dynamic cyber adversarial operations, comprising:
an algorithm stored on a non-transitory computer readable medium for a history based expansion of a suspicion relating to a suspected cyber attack comprising:
selects an element from each of a plurality of predetermined adversarial categories that identify lines of reasoning regarding a suspected cyber attack, which selected elements correspond to nodes in a Bayesian multiple hypothesis tree graph;
selects a certainty value that the suspected cyber attack will occur;
for each node corresponding to a selected element, evaluates a line of reasoning associated therewith by searching a contextual hierarchical knowledge store to determine its weighted probability value and expanding the node to identify each of its child nodes;
calculates a weighted probability value of each of the child nodes, which is the weighted probability value of the parent node multiplied by a ratio value of the child node, which is the ratio of historic recorded incidents for that node in relation to other nodes;
calculates certainty values for each of the child nodes, which is the weighted probability value of the respective child node multiplied by a danger value associated with the respective child node, which is the average of the danger values for the historic incidents on that node;
selects the child node having the largest weighted probability as a new current node;
locates a node in the contextual hierarchical knowledge store corresponding to the new current node;
expands the new current node to identify each of its child nodes;
calculates weighted probability and certainty values for each of the child nodes of the new current node using rolled-up data associated with each current node;
selects the child node of the new current node having the largest weighted probability as a new current node;
repeats the last four steps until no child nodes are found;
continues processing each line of reasoning in a round-robin fashion until no new current nodes for any of the lines of reasoning are found; and
identifies the child node having the largest certainty value as the most likely cyber attack.

2. A non-transitory computer readable medium including a software, the software comprising:
one or more code segments that selects an element from each of a plurality of predetermined adversarial categories that identify lines of reasoning regarding a suspected cyber attack, which selected elements correspond to nodes in a Bayesian multiple hypothesis tree graph;
one or more code segments that selects a certainty value that the suspected cyber attack will occur;
one or more code segments that, for each node corresponding to a selected element, evaluates a line of reasoning associated therewith by searching a contextual hierarchical knowledge store to determine its weighted probability value and expanding the node to identify each of its child nodes;
one or more code segments that calculates a weighted probability value of each of the child nodes, which is the weighted probability value of the parent node multiplied by a ratio value of the child node, which is the ratio of historic recorded incidents for that node in relation to other nodes;
one or more code segments that calculates certainty values for each of the child nodes, which is the weighted probability value of the respective child node multiplied by a danger value associated with the respective child node, which is the average of the danger values for the historic incidents on that node;
one or more code segments that selects the child node having the largest weighted probability as a new current node;
one or more code segments that locates a node in the contextual hierarchical knowledge store corresponding to the new current node;
one or more code segments that expands the new current node to identify each of its child nodes;

one or more code segments that calculates weighted probability and certainty values for each of the child nodes of the new current node using rolled-up data associated with each current node;

one or more code segments that selects the child node of the new current node having the largest weighted probability as a new current node;

one or more code segments that repeats the last four steps until no child nodes are found;

one or more code segments that continues processing each line of reasoning in a round-robin fashion until no new current nodes for any of the lines of reasoning are found; and one or more code segments that identifies the child node having the largest certainty value as the most likely cyber attack.

3. A method of evaluating dynamic cyber adversarial operations, comprising:

selecting an element from each of a plurality of predetermined adversarial categories that identify lines of reasoning regarding a suspected cyber attack, which selected elements correspond to nodes in a Bayesian multiple hypothesis tree graph;

selecting a certainty value that the suspected cyber attack will occur;

for each node corresponding to a selected element, evaluating a line of reasoning associated therewith by searching a contextual hierarchical knowledge store to determine its weighted probability value and expanding the node to identify each of its child nodes;

calculating a weighted probability value of each of the child nodes, which is the weighted probability value of the parent node multiplied by a ratio value of the child node, which is the ratio of historic recorded incidents for that node in relation to other nodes;

calculating certainty values for each of the child nodes, which is the weighted probability value of the respective child node multiplied by a danger value associated with the respective child node, which is the average of the danger values for the historic incidents on that node;

selecting the child node having the largest weighted probability as a new current node;

locating a node in the contextual hierarchical knowledge store corresponding to the new current node;

expanding the new current node to identify each of its child nodes;

calculating weighted probability and certainty values for each of the child nodes of the new current node using rolled-up data associated with each current node;

selecting the child node of the new current node having the largest weighted probability as a new current node;

repeating the last four steps until no child nodes are found;

continuing processing each line of reasoning in a round-robin fashion until no new current nodes for any of the lines of reasoning are found; and identifying the child node having the largest certainty value as the most likely cyber attack.

* * * * *